United States Patent
Chan

(10) Patent No.: US 6,763,189 B2
(45) Date of Patent: Jul. 13, 2004

(54) FILM ALIGNMENT MECHANISM AND FRAME COUNTER RESETTING MECHANISM

(75) Inventor: Yet Chan, Kowloon (HK)

(73) Assignee: Foster Assets Corporation (HK)

(*) Notice: Subject to any disclaimer, the term of this patent is extended or adjusted under 35 U.S.C. 154(b) by 0 days.

(21) Appl. No.: 10/417,450

(22) Filed: Apr. 16, 2003

(65) Prior Publication Data

US 2003/0210905 A1 Nov. 13, 2003

Related U.S. Application Data

(62) Division of application No. 09/665,132, filed on Sep. 19, 2000, now Pat. No. 6,587,645.

(51) Int. Cl.[7] .................................................. G03B 17/36
(52) U.S. Cl. ........................................................ 396/284
(58) Field of Search .................................. 396/284, 281, 396/411, 413, 6; 235/108, 111, 114

(56) References Cited

U.S. PATENT DOCUMENTS

| | | | | |
|---|---|---|---|---|
| 3,754,460 A | * | 8/1973 | Tanaka | 396/284 |
| 4,896,180 A | * | 1/1990 | Lawther | 396/284 |
| 6,374,055 B1 | * | 4/2002 | Schroder | 396/284 |
| 6,463,219 B1 | * | 10/2002 | Schroder | 396/284 |

* cited by examiner

Primary Examiner—Christopher Mahoney
(74) Attorney, Agent, or Firm—Ostrolenk, Faber, Gerb & Soffen, LLP

(57) ABSTRACT

A camera for use with film bearing a series of latent pre-exposed images for subsequent user-exposure, comprises a film sprocket wheel (34) extending into a film passageway, the sprocket wheel comprising a wheel having a plurality of equidistantly-spaced teeth one (42) of which is visually distinguishable from other teeth, for example being formed of a contrasting color.

5 Claims, 6 Drawing Sheets

FILM ALIGNMENT MECHANISM AND FRAME COUNTER RESETTING MECHANISM

CROSS REFERENCE TO RELATED APPLICATION

This is a divisional of U.S. patent application Ser. No. 09/665,132, filed Sep. 19, 2000, in the name of Yet Chan and entitled "FILM ALIGNMENT MECHANISM AND FRAME COUNTER RESETTING MECHANISM", now U.S. Pat. No. 6,587,645.

BACKGROUND OF THE INVENTION

The present invention relates to a mechanism suitable for ensuring alignment within a camera of film having pre-exposed latent images thereon, and to a camera incorporating such a mechanism, and to a film frame counter resetting mechanism.

It is known to provide photographic film which has been partly exposed in regions of each film frame with an image which is retained as a latent image. The user who loads the film then exposes the film in the normal manner in a specially adapted camera. The camera includes some masking arrangement to mask out the area of the film which bears the latent images, so that these are not double-exposed. When the film has been exposed by the user, it is processed and developed in the normal way, the finished pictures bearing both the pre-exposed images provided by the manufacturer (hereinafter referred to as "pre-exposed images"), and the user-exposed images thereon. For example, it can be arranged that the film is pre-exposed with a decorative strip which carries a message such as "happy birthday" or "wish you were here", the camera including a strip-like mask in the exposure window to prevent double-exposure of the pre-exposed film region.

It has been previously proposed by the applicant to provide such a film in a package or assembly comprising a standard 35 mm cassette and a second spoolless film container into which the film is wound extending from there to the cassette. Such a film package is disclosed for example in applicant's U.S. patent application Ser. No. 10/141,751. In use, the assembly is fitted into the camera with the cassette and film container arranged on opposite sides of a film exposure window. As pictures are successively taken the film is progressively wound out of the film container back in the cassette, finally being wound back fully into the cassette which can then be removed by the user for developing and processing. The film container is then discarded.

A particular problem arises in seeking to align the film in the camera, since it is necessary that the film be precisely positioned in the camera so that the pre-exposed images align precisely with the exposure window of the camera and hence the user-exposed images.

In one aspect the present invention is directed to ensuring this alignment.

SUMMARY OF THE INVENTION

In a first aspect the invention provides a camera for use with film bearing a series of latent pre-exposed images for subsequent user-exposure, comprising a film sprocket mechanism extending into a film passageway, the sprocket mechanism having a plurality of equidistantly-spaced teeth including an alignment tooth which is visually distinguishable from the other tooth, and comprising a main wheel part on which said other teeth are formed, and a separate part securable to the main wheel part which carries the alignment tooth.

The alignment tooth may be formed of a different colour to the other teeth, either by painting the alignment tooth or moulding it of a different coloured plastics material.

These parts may be formed of moulded plastics where the plastics are of contrasting colours. The main wheel part may define a part-annular recess, and the alignment tooth extends from a part-annular insert receivable in said recess. The sprocket wheel may be operatively commented to a shutter mechanism and wind-on mechanism where rotation of the sprocket wheel is arranged to effect re-cocking of the shutter mechanism. The wind-on mechanism prevents rotation of the sprocket wheel when the shutter is re-cocked. In the re-cocked state of the shutter mechanism the alignment tooth extends rearwardly within the camera towards the film passageway.

In a further aspect the invention resides in a sprocket wheel as defined above.

In a further aspect the invention resides in a method of loading film bearing a series of pre-exposed latent images for subsequent user-exposure into a camera having a film sprocket wheel operatively connected to a shutter mechanism and provided with a film alignment tooth, comprising the steps of: a) opening the camera back; b) rotating the film sprocket wheel until the film alignment tooth thereof extends towards the film passageway, and until the shutter mechanism is re-cocked; c) inserting film into the camera so that an alignment mark on the film is aligned with the alignment tooth; and d) closing the camera back.

A further problem with simple cameras of this type where the user reloads the film is in re-setting of the film frame counter, and a second aspect of the invention is directed to a mechanism for carrying out this resetting.

In a further aspect directed to resetting of the film frame counter, the invention resides in a camera having a pair of film-receiving chambers arranged on opposite sides of an exposure window between which, in use, film extends through a film passageway: a film sprocket wheel having a plurality of teeth which, in use, engage a film extending within the film passageway; a film counter drive wheel operatively connected to the film sprocket wheel driven by rotation of the sprocket wheel; a pivotably mounted film frame counter wheel mounted on a displaceable pivot engageable with the drive wheel; and resilient means which urge the film frame counter wheel to a reset position in which the film frame counter wheel adopts a predefined orientation.

BRIEF DESCRIPTION OF THE DRAWINGS

Embodiments of the invention are now described, by way of example only, with reference to the following drawings in which.

DETAILED DESCRIPTION OF THE PREFERRED EMBODIMENT

Figure 1:
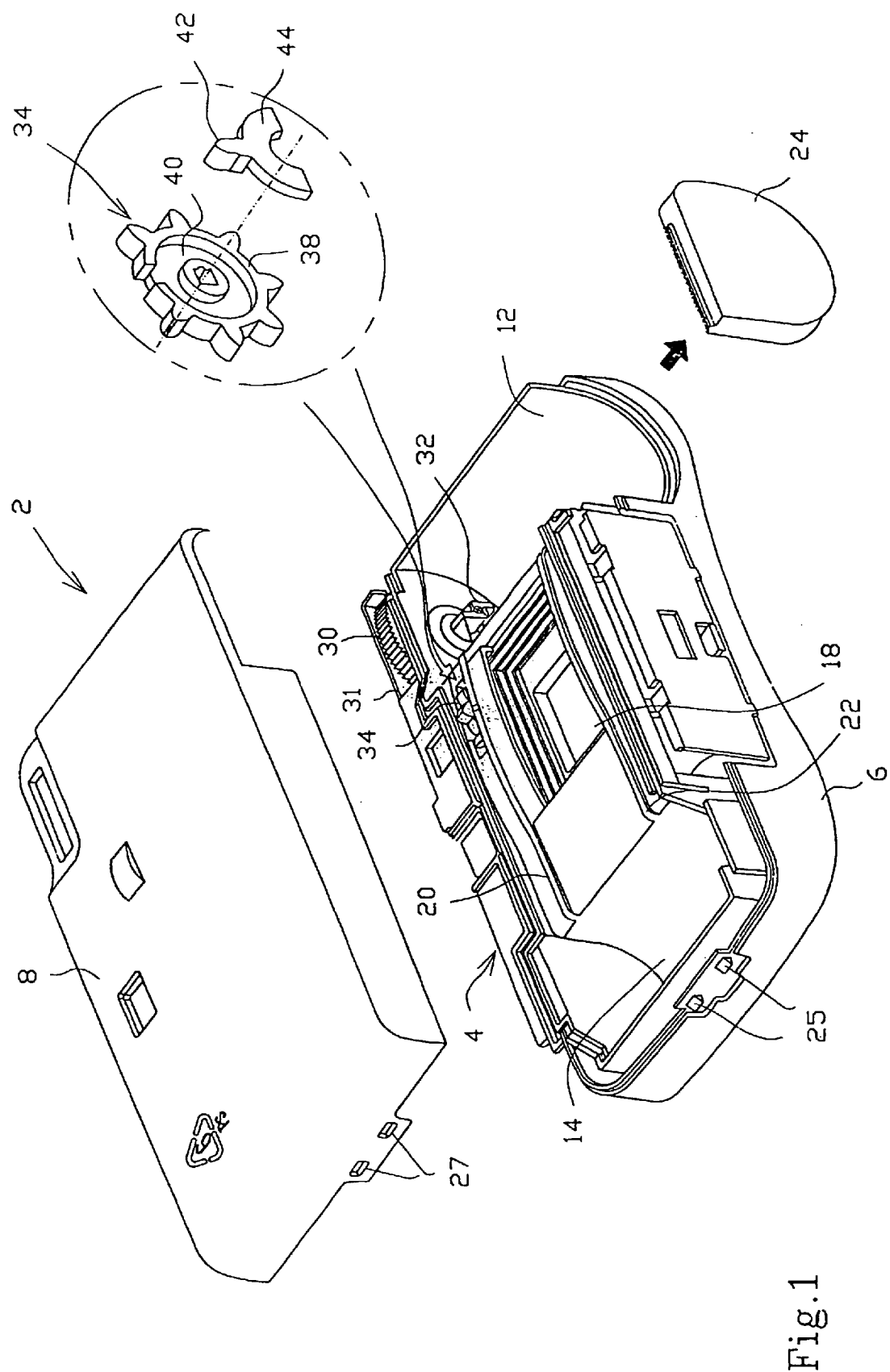
FIG. 1 shows a camera in accordance with an embodiment of the invention with a back cover opened and a film door removed.

As seen in FIG. 1, the camera, indicated generally by numeral 2, includes a main body part 4 which carries the majority of the operative components of the camera 2, and a front cover part 6 and rear or back cover part 8 which together enclose the main body 4. The main body 4 supports a shutter mechanism 9 provided with a lens assembly 11 (FIG. 5), a front portion of which extends through an aperture in the front cover part 6. The main body 4 defines part of a first film-cassette receiving chamber 12 which receives a film-containing cassette or patrone 13 of a film package or assembly described further below. Other standard film formats can equally be accommodated with appropriate modification. A second film receiving chamber 14 is arranged at the opposite side of the camera. Between the film chambers 12 and 14 is arranged an exposure window 18 located between upper and lower film guides 20, 22 which support the film at its edges as it extends between the film chambers. A film passageway for the film to travel between the film chambers 12 and 14 is defined between the back cover 8 and opposed region of the main body 4 and film guides 20, 22. The main body 4, and front and rear cover parts 6, 8 define an opening at the lower end of the film cassette chamber 12, which is closed in use by a removable film door 24, allowing removal of the film cassette 13 through the opening once the film has been exposed. As is known in the art, the film door 24 and adjacent parts of the main body 4 are provided with appropriate adaptations in the form of co-operating grooves on the cover plate 24 and flanges on the main body 4 which together ensure light-tight closure of the opening.

The rear cover part 8 is removably fitted to the main body 4. This is achieved by providing at opposite edges a pair of protrusions 25 on the main body 4 which snap-fit into apertures 27 on the back cover 8. Alternatively, the back cover 8 can be hingedly secured to the main body 4 or the front cover 6 and a releasable latch provided to allow opening and closing of the back cover 8. These arrangements allow the user to readily open and close the camera for reloading films therein.

As is conventional, the camera is provided with a wind-on mechanism including a rotatable film advance wheel or thumb wheel 30 having a plurality of teeth held on top of the main body 4 beneath a plate 31, and lower shaped drive shaft 32 which extends into and engages the central spool of the conventional film patrone or cassette 13. The mechanism includes a film sprocket wheel 34 located just above the film exposure window 18, and a film counter. The film sprocket wheel 34 is operatively connected to the re-cocking mechanism of the shutter, so that each time the film is wound on one frame by the user (by turning the film advance wheel), the film sprocket wheel is rotated one turn, which primes the shutter, and in addition prevents further rotation of the film advance wheel 30, as is further described below.

The film is provided in the form of a film assembly comprising a first film cassette 13 which is a conventional 35 mm cassette or patrone, and a second film container 15 preferably of a smaller dimension than a conventional cassette, into which the majority of the film is pre-wound before the assembly is supplied to the user. A flexible backing strip 17 is joined to both cassette 13 and container 15 to prevent separation of the cassette 13 and container 15 which could result in inadvertent withdrawal of film. A cut-out portion 19 is provided in the backing strip 17 exposing a portion of the film edge. As can be seen more clearly in FIG. 3 the film is provided with an alignment notch 21 adjacent an alignment perforation 23.

FIG. 1 shows in the inset a sprocket gear 34 comprising eight sprocket teeth, the gear being precisely dimensioned so the circumference is the dimension of one film frame so that the teeth fit into the sprocket holes of a 35 mm film and so that advance of the film by a single film frame causes precisely a single rotation of the gear.

The sprocket gear 34 comprises two separate parts, namely a main gear 38 having seven spaced teeth and which defines an annular or a part-annular recess 40, and a slot at the position of the eighth tooth, and a separate alignment tooth part 42 formed on a part-annular portion 44 which constitutes an insert fitting into the recess 40. This allows the alignment tooth 42 to be moulded out of a different coloured plastics material; for example, the majority of the camera components are usually of black moulded plastics; alignment tooth 42 may be of a contrasting colour such as white.

The shutter mechanism 9 contains a spring-loaded shutter plate which has an exposed end S arranged to be stroked by a striker 50 (further discussed below) of a trigger mechanism 140 for momentarily flicking the shutter plate (shutter release) and thus opening an exposure aperture behind the lens to permit photographic exposure on the film through the exposure chamber 18.

The trigger mechanism 140 is formed by the striker 50 which is horizontally pivotable and an assembly of the sprocket 34 and an upper cam 70 which are axially interengaged for simultaneous horizontal rotation. The striker 50 has first, second and third side projections 51, 52 and 53 and is spring-loaded by spring 90 to, on release, turn in the anti-clockwise sense (viewed from above) and also to move upwards, thereby urging the second projection 52 to stroke the shutter plate end S and urging the third projection 53 against the cam 70.

The sprocket 34 is keyed to the cam 70 so that upon movement by the film-advancing wheel 30, the film rotates the sprocket 34 and in turn the cam 70 above in the same direction.

The cam 70 has an upper circular disc portion 71 (shown in dotted lines to allow the features below to be seen) having a side cutout 72 and a lower radially expanding cam portion 73 having a radial step 74, the cutout 72 being formed immediately in front of the step 74 below. The cam portion 73 is arranged to be in side contact with the third projection 53 of the striker 50 for, upon rotation by the sprocket 34 and through a cam action, turning the striker 50 in the opposite clockwise direction against the action of a spring 90. The striker 50 will stop turning when its third projection 53 reaches and interlocks from below with the cutout 72, the striker moving upwards under the continual upward action of the same spring 90. At this time, all the aforesaid rotating and turning actions stop and the film advancement is just completed. At this position a lug 80 on the first projection 51 is urged up to engage the film advance wheel 30 from below preventing it from being rotated. The sprocket wheel 34 also cannot be rotated as the cam 70 is prevented from rotating by the third projection 53.

At such time, the film strip has just been advanced for one frame and the trigger mechanism 140 is primed or re-cocked ready for action to permit photographic exposure on the film strip. For this purpose, the user is required to depress a trigger button (not shown) which engages the top 92 of the striker's axle for moving the striker 50 downwards to release the third projection 53 is urged to turn back quickly under the action of the spring to have its second projection 52 stroking the shutter plate end S as described above. The projection 80 is then clear of the film advance wheel 30 which can then be rotated to wind on the film.

It is arranged that the sprocket gear 34 is positioned on the cam 70 so that at the position in which the alignment tooth 42 is extending exactly rearwardly towards the film, the shutter mechanism is re-cocked and the sprocket 34 cannot be moved any further. Thus, the position of the alignment tooth 42 is precisely defined and cannot be varied by the person installing the film, whereby precise alignment of the film bearing pre-exposed images with the film frame can be readily achieved.

In use, the user opens the camera back as shown in FIG. 1. The film door 24 will have been previously removed to remove the exposed film, or in the case of a new camera, is detached.

The sprocket gear 34 must be rotated manually in an anti-clockwise sense (viewed from above) or rightward direction (viewed towards the rear of the camera) until it can be rotated no further at which position the alignment tooth 42 will point exactly rearwardly towards the film.

Figure 2:
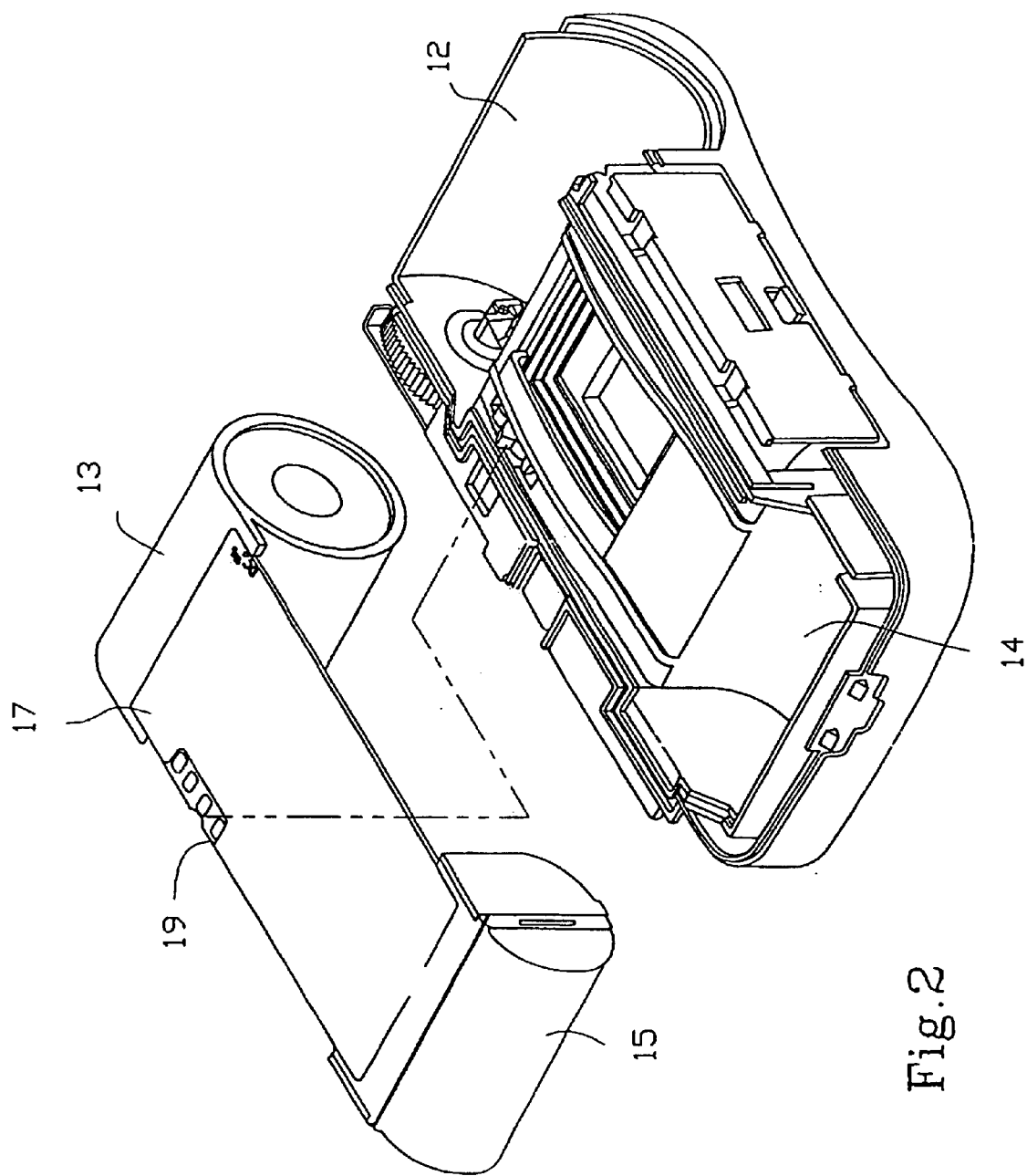
FIG. 2 shows the insertion of a film package into the camera.
Figure 3:
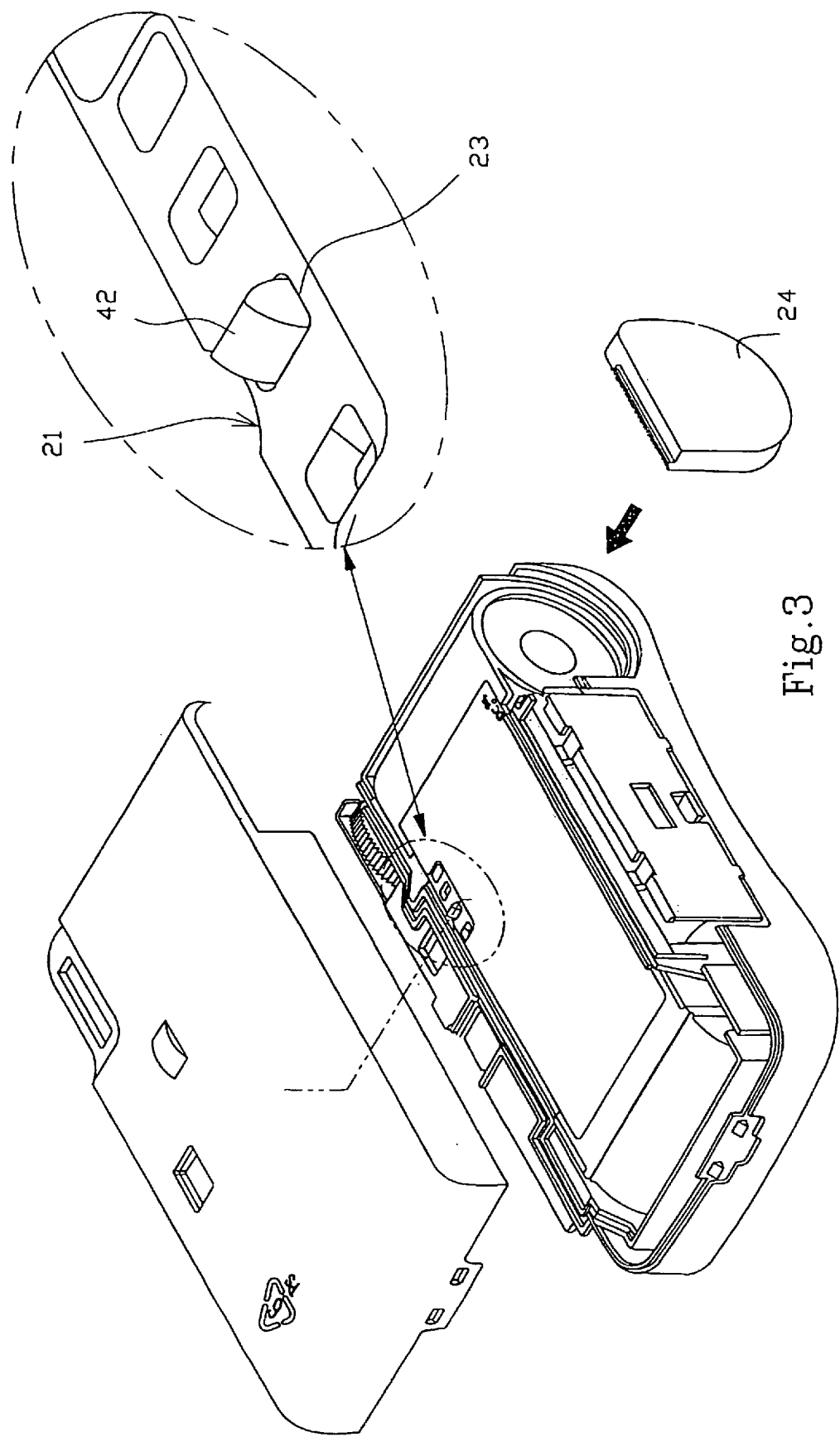
FIG. 3 shows the film fitted into the camera and correctly aligned with an alignment sprocket.
Figure 4:
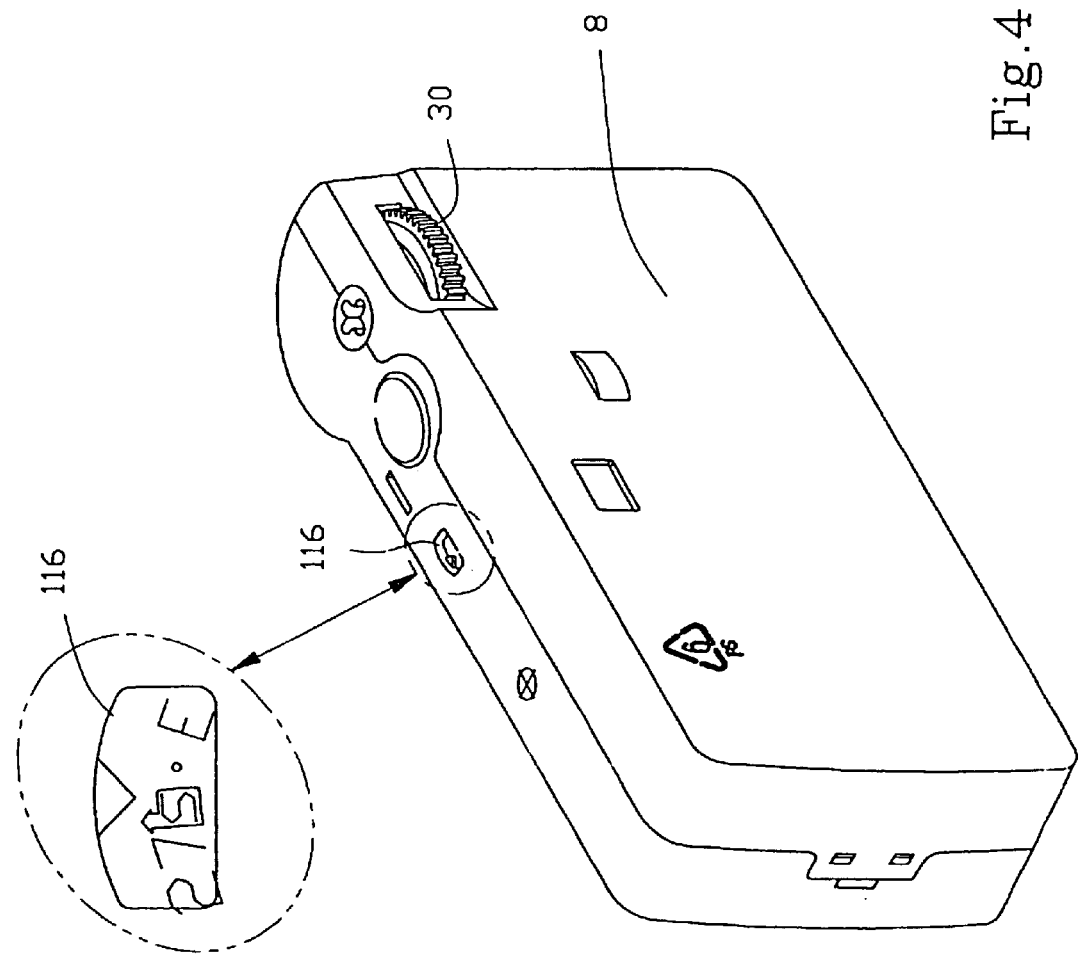
FIG. 4 shows the camera with the back fitted thereon.

As shown in FIGS. 2 and 3 a film package is fitted into the film chambers with the alignment notch 21 aligned with the alignment tooth 42. The film door is fitted and camera back closed. In this position the film counter will show the number of exposures remaining eg 27 exposures, as shown in FIG. 4. The camera is then ready for use by the user with the film precisely aligned therein.

In an alternative modification, instead of forming the alignment tooth 42 as a separate part, the sprocket wheel can instead have all eight teeth formed unitarily, and the alignment tooth can be painted a separate colour or coated in some other way to give a contrasting colour to the other seven teeth.

In a still further alternative the alignment tooth is distinguished by some other indicating means such as use of a marking, indicia or symbol or letters or similar.

In a still further alternative the alignment tooth may have a different shape to distinguish it from the other seven teeth.

Figure 5:
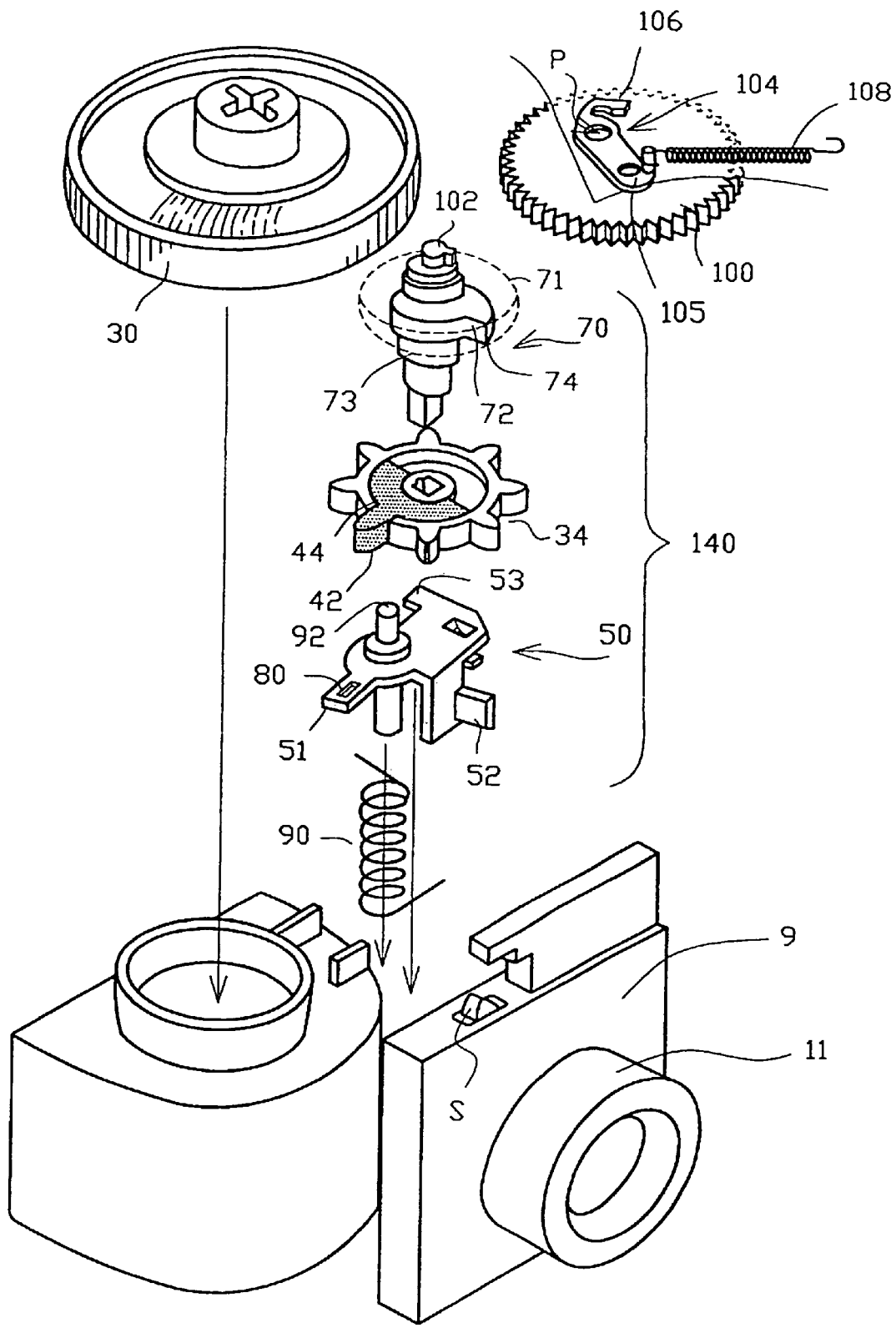
FIG. 5 shows the shutter and wind-on mechanisms of the camera.

FIG. 5 also shows a film frame counter 100. The counter 100 has a plurality of peripheral teeth, and markings indicative of the number of film frames remaining and is supported on the top plate 31. It is driven for rotation by a drive wheel 102 formed unitarily with the top of the cam 70. Thus, as the cam 70 rotates as film is wound on the counter 100 rotates, by a single tooth for each film frame.

Unlike a conventional film frame counter wheel which is mounted to rotate about a fixed pivot point, the counter wheel 100 is mounted on a movable axis.

More particularly, a lever 104 is provided which is itself mounted on the top plate 31 and beneath the counter 100 (note that the overlying portion of the counter is cutaway in the drawings to show this) to pivot about point P. At one end 105 the lever 104 supports the film frame counter wheel in a manner to allow rotation. At the other end 106 the lever 104 is provided with an actuating surface which bears against the inside of the camera back 8 when the back is closed, as discussed further below.

The film counter wheel 100 is provided with resilient means in the form of a coil spring 108 which extends between a claw 110 on the top plate and a short finger 112 depending on the underside of the film frame counter wheel 100 adjacent to the pivot.

When the camera back is open the lever 104 is unconstrained by the back and the force of the spring 108 (FIG. 8) urges the lever 104 in the direction of the arrow A in FIG. 1 and pulls the axis of the film frame counter wheel 100 away from the counter wheel drive gear 102 so the periphery is disengaged therefrom. The film frame counter wheel 100 is thereby unconstrained by the drive gear 102 and will rotate to adopt the position shown in FIG. 8 where the lever abuts a stop 114 on the underside of the top plate 31.

Figure 6:
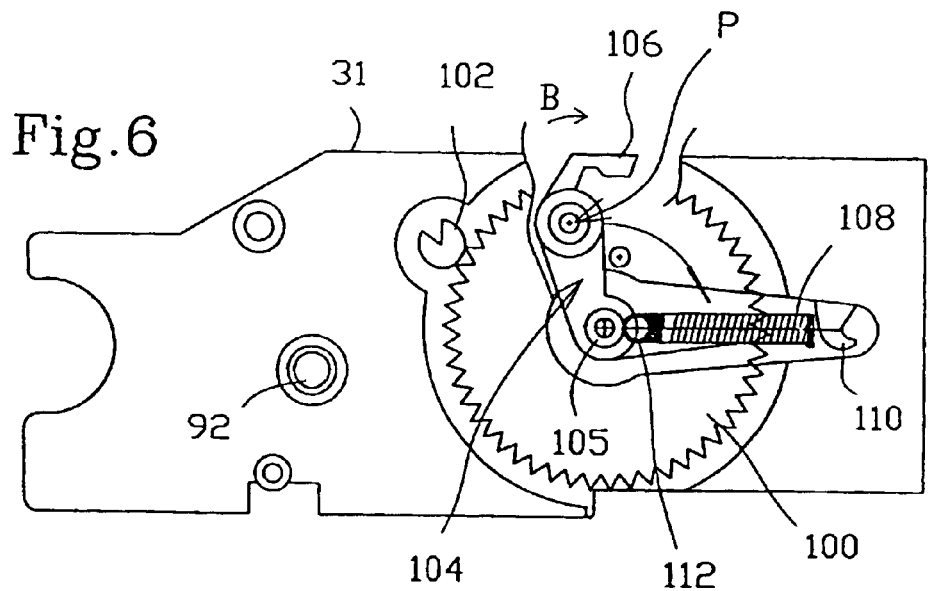
FIG. 6 shows a mechanism for re-setting a film frame counter when the counter is at a "start" position.

After insertion of film into the camera, the camera back is closed so that the back bears against the actuating end 106 of the lever 104 urging this to pivot through a small angle in the direction of the arrow B in FIG. 6. In this position the edge of the film frame counter wheel 100 bears against the counter wheel advancing drive gear 102. In this position a "start" or S mark on the film frame counter 100 will be aligned with the frame counter window 116 on the top of the outer camera housing.

Figure 7:
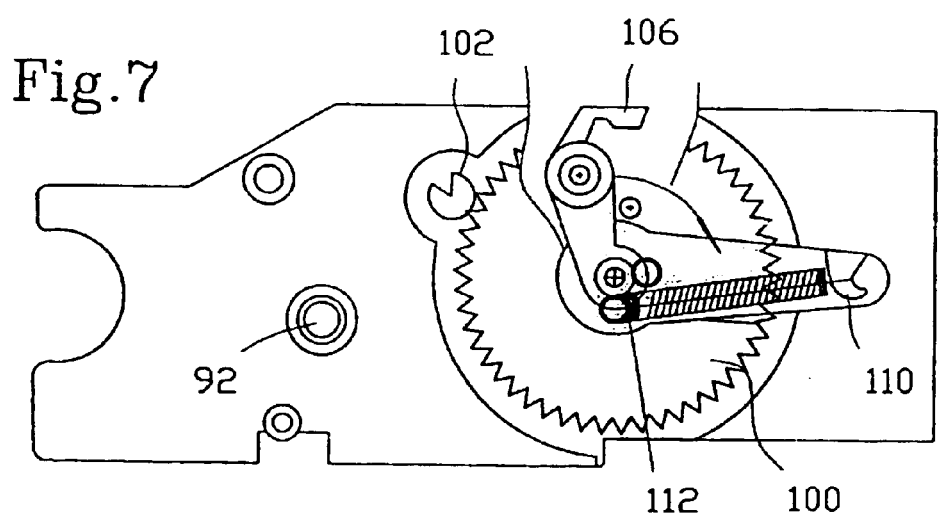
FIG. 7 shows the mechanism of FIG. 6 at a position corresponding to part exposure of a film.
Figure 8:
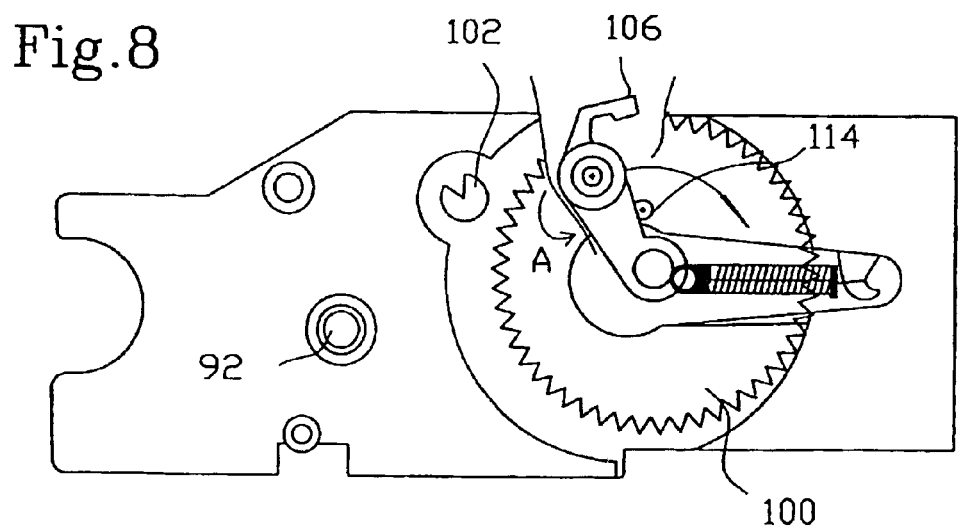
FIG. 8 shows the mechanism of FIG. 6 on re-setting.

As can be seen in FIGS. 6 to 8, the actuating end 106 of the lever 104 is joined to the portion which is pivotably mounted on the top plate through a narrowed region which accords a degree of resilience. This gives the bearing of the film frame counter wheel 100 against the drive gear 102 a degree of resilience so that a continuos bearing force is supplied to the gear wheel and means that excessive force is not imparted to the drive gear 102.

As pictures are successively taken and the film is advanced, the drive gear rotates 102 once for each film frame advanced, and for each rotation of the drive gear 102 the film frame counter wheel 110 is rotated in a clockwise sense by a distance corresponding to one tooth. As the film is advanced and the counter wheel 100 progressively rotates the spring 108 becomes increasingly extended, and becomes increasingly wrapped around the pivot. FIG. 7 shows the end of the spring 108 in a position corresponding to 12 exposures remaining on the film.

When the end of the film is recorded the film is removed by the user through the film door. In order to reload the camera, the camera door is opened, and when this occurs the pivoting of the lever to the position described above and shown in FIG. 8 is allowed and the rotation of the counter wheel 100 also allowed, thereby automatically resetting the film counter so the start mark S appears in the counter window 116.

The mechanism described allows for automatic re-setting of the frame counter.

What is claimed is:

1. A camera having a pair of film-receiving chambers arranged on opposite sides of an exposure window between which, in use, film extends through a film passageway:

a film sprocket wheel having a plurality of teeth which, in use, engage a film extending within the film passageway;

a film counter drive wheel operatively connected to the film sprocket wheel driven by rotation of the sprocket wheel;

a film frame counter wheel mounted on a movable pivot engageable with the drive wheel; and resilient means which urge the film frame counter wheel to a reset position in which the film frame counter wheel adopts a predefined orientation.

2. A camera according to claim 1 wherein the pivot for the film frame counter wheel is mounted to allow displacement between a position in which the counter wheel and drive gear are engaged, and a position in which they are separated.

3. A camera according to claim 1 wherein the said resilient means acts on the pivot to urge the counter wheel to the disengaged position.

4. A camera according to claim 3 wherein the pivot for the counter wheel is mounted on a lever which is movable to allow movement of the counter wheel into and out of engagement with the drive gear.

5. A camera according to claim 4 wherein an end of the lever opposite to the mounting of the counter wheel bears against a door of the camera, whereby when in a closed position the door bears against the lever and urges the counter wheel and drive gear into engagement.

* * * * *